United States Patent [19]

Schuyler

[11] Patent Number: 5,168,236
[45] Date of Patent: Dec. 1, 1992

[54] FAULT DETECTION CIRCUIT FOR USE IN DETERMINING THE EXISTENCE OF A FAULT IN ANY ONE OF A PLURALITY OF MULTI-PHASE LOADS

[75] Inventor: Martin Schuyler, Hastings-on-Hudson, N.Y.

[73] Assignee: Cox & Company, Inc., New York, N.Y.

[21] Appl. No.: 703,005

[22] Filed: May 20, 1991

[51] Int. Cl.⁵ ............................................ G01R 31/00
[52] U.S. Cl. ................................. 324/511; 324/510; 324/158 MG; 340/661
[58] Field of Search ................................. 324/509–511, 324/522, 525, 526, 537, 549, 705, 706, 725, 107, 158 MP, 545; 361/44, 47, 48, 56, 62, 86, 87; 307/13; 340/661, 649, 650

[56] References Cited

U.S. PATENT DOCUMENTS

| | | | |
|---|---|---|---|
| 2,858,457 | 10/1958 | Epstein et al. | |
| 3,243,796 | 3/1966 | Harmon et al. | 340/645 |
| 3,340,459 | 9/1967 | Fields et al. | 324/107 X |
| 3,364,007 | 12/1982 | Cutler et al. | 324/525 X |
| 3,558,981 | 1/1971 | Zocholl | 361/44 |
| 3,716,718 | 2/1973 | Nowell | 307/13 |
| 4,021,703 | 5/1977 | Gary et al. | 361/85 |
| 4,099,215 | 7/1978 | Parrier et al. | 361/42 |
| 4,199,798 | 4/1980 | Leppke et al. | 361/76 |
| 4,333,119 | 6/1982 | Schoenmey | 361/76 |
| 4,496,940 | 1/1985 | Christel, Jr. | 340/640 |
| 4,542,433 | 9/1985 | Schaefer et al. | 307/127 X |
| 4,580,186 | 4/1986 | Parker et al. | 361/42 |

Primary Examiner—Gerard R. Strecker
Assistant Examiner—Diep Do
Attorney, Agent, or Firm—Mark H. Jay

[57] ABSTRACT

A fault detection circuit for a plurality of three-phase loads uses a wye-connected reference load as a benchmark. The voltages at the centerpoints of the loads to be monitored are monitored and the largest monitored voltage is identified. This largest voltage is compared with the voltage of the centerpoint of the reference load. The comparison is affected by faults which do not affect all loads equally (as by a short or open in one of the phases of one of the loads) and is unaffected by faults which do affect all loads equally (as by changes in voltage of one of the phases of the source).

10 Claims, 1 Drawing Sheet

FAULT DETECTION CIRCUIT FOR USE IN DETERMINING THE EXISTENCE OF A FAULT IN ANY ONE OF A PLURALITY OF MULTI-PHASE LOADS

BACKGROUND OF THE INVENTION

The invention relates to fault detection circuits, and more particularly relates to fault detection circuits for multi-phase loads. In its most immediate sense, the invention relates to fault detection circuits which are used in high-reliability three-phase aerospace applications where the proper performance of critical loads, such as anti-icing or deicing heaters, or three-phase AC motors, must be continuously monitored.

Aircraft conventionally use 400 Hz, three-phase power supplies. Anti-icing and deicing heaters, such as those on engine inlet fairings and leading surfaces of wings, are typically in wye-configuration.

These heaters must function properly and the pilot must be informed if they cease to do so. If such a heater malfunctions, a large chunk of ice can accrete and, e.g., damage the engine when the chunk breaks off. Therefore, airframe manufacturers have long required the provision of fault detection circuitry to automatically alert the pilot if, e.g. a critical heater develops a fault that causes it to operate improperly.

Each phase of wye-connected loads of this type typically contains many circuits in parallel. As the number of such circuits increases, so too does the difficulty of accurately detecting the failure of a single circuit. This is because such a failure may cause only a small change in the resistance of that phase of the load.

As a theoretical matter, it would be possible to tap each of the many circuits in a wye-connected load and to monitor the voltage across each circuit in a fault detection circuit. However, two main reasons make this solution impractical. First, there would be many taps and it would be difficult and costly to route the necessary wiring through, e.g., a heated fairing. Second, the voltages of the various phases of the source can vary during normal operation. Such variation, reflected across a single circuit in a single phase, could easily be interpreted as a malfunction.

It would therefore be advantageous to provide a circuit for monitoring heaters of this type which would be sensitive enough to respond even to small changes in resistance of the circuit, while being unresponsive even to large changes in voltage of the phases of the source.

One object of the invention is to provide a fault detection circuit for determining the existence of a fault in any one of a plurality of centerpoint-connected loads which are supplied by a multi-phase source.

Another object is to provide such a circuit which is highly sensitive to faults in the loads and highly insensitive to changes in the source.

A further object is to provide such a circuit which does not require the use of many conductors which must be routed out of the loads.

Still a further object is, in general, to improve on prior art circuits of this general type.

The invention proceeds from the realization that where there are a plurality of centerpoint-connected loads all supplied by a single multi-phase source, variations in voltage of the source phases, and indeed shorting of one or more phases to ground, will affect the centerpoints of all of the loads in the same way. On the other hand, where a fault develops in one of the loads, the centerpoint of that load will be affected while the centerpoints of the other loads will not.

In accordance with the invention, a reference centerpoint-connected load is connected to the multi-phase source and the reference centerpoint of that reference load is used as a benchmark. The voltages at the centerpoints of all the loads to be monitored are themselves monitored and the largest monitored voltage is identified. This largest voltage is then compared against the voltage of the centerpoint of the reference load.

Where a load fault has developed, the comparison makes the fault manifest even if the fault is relatively small, because a small voltage change in one phase of the load will cause a large shift in the voltage of the centerpoint of the load. Alternatively, where a source fault (e.g. a change in voltage of one of the source phases, a shorting of one or more phases to ground, etc.) takes place, all of the loads (including the reference load) are affected identically and the comparison shows no change as it does with a load fault.

BRIEF DESCRIPTION OF THE DRAWINGS

The invention will be better understood with reference to the following illustrative and non-limiting drawings, in which.

DETAILED DESCRIPTION OF A PREFERRED EMBODIMENT

Figure 1:
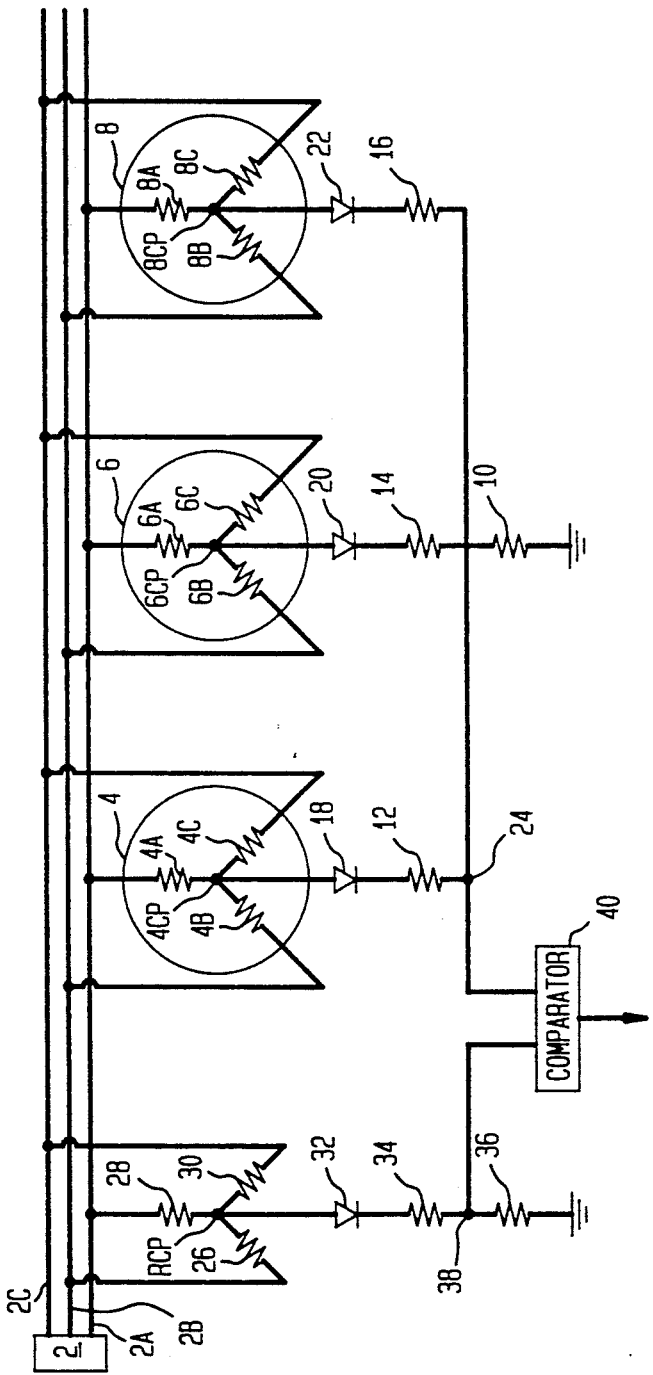
FIG. 1 is a schematic diagram of a preferred embodiment of the invention as used to monitor resistive loads.

A three-phase source 2 in, e.g., an airplane (not shown) has three phases 2A, 2B and 2C. Loads 4, 6 and 8 are supplied by the source; load 4 may for example be a heated fairing on the airplane, load 6 may for example be a wing heater, and load 8 may for example be a windshield heater. It will be understood that the invention does not reside in the particular application for the load and that the named applications are only exemplary. It will also be understood that the invention does not reside in the use of three loads; any number which is equal to or greater than two can be monitored. It will further be understood that the loads 4, 6 and 8 need not be equal and need only be centerpoint-connected. It will still further be understood that the source may have any number of phases which is equal to or greater than two.

Each of the loads 4, 6 and 8 has three phases connected in a wye-configuration. In the case of load 4, the phases are shown as 4A, 4B and 4C and the centerpoint is 4CP, in the case of load 6 the phases are shown as 6A, 6B and 6C and the centerpoint is shown as 6CP, and so on. Each phase may be, and in aerospace applications usually is, made up of a plurality of circuits in parallel.

Each centerpoint of each load 4, 6 and 8 is connected to ground through a diode and a tapped voltage divider. In each instance, the tapped voltage divider is formed by grounded resistor 10 and another resistor; resistor 12 in the case of centerpoint 4CP, resistor 14 in the case of centerpoint 6CP, and resistor 16 in the case of centerpoint 8CP. The voltage dividers are connected to centerpoints 4CP, 6CP and 8CP by diodes 18, 20 and 22 respectively.

The resistors 12, 14 and 16 are identical, as are diodes 18, 20 and 22. Advantageously, the resistor 10 is twenty times the resistance of each of the resistors 12, 14 and 16 and one thousand times the resistance of loads 4, 6 and 8.

A reference wye-connected load is constructed of equal resistances 26, 28 and 30 which are connected in wye configuration to the phases of the supply 2. The reference centerpoint RCP is connected to ground through a diode 32 and a voltage divider formed of resistors 34 and 36. The voltage divider has a tap 38 located between resistors 34 and 36. Advantageously, resistor 34 equals the resistances of each of resistors 12, 14 and 16, and resistor 36 advantageously has the same value as resistor 10.

A comparator 40 compares the voltages at taps 24 and 38. In the ideal case, all the loads 4, 6 and 8 will be operating properly. In this instance, the voltages at centerpoints 4CP, 6CP, 8CP and RCP will be identical and therefore the voltages at taps 24 and 38 will be almost identical. (The reason why these voltages will not be precisely identical is explained below.) In this instance, the comparator 40 outputs only a very small signal.

However, let it be assumed that one of the phases of one of the loads, say phase 6A, has a short or an open in one of the circuits so as to change its resistance slightly. This will increase the voltage at centerpoint 6CP above the voltages at centerpoints 4CP and 8CP.

Because the voltage at centerpoint 6CP is the greatest of the voltages at the centerpoints of all the loads to be monitored and the diodes 18 and 22 prevent current from flowing backwards from tap 24 to the centerpoints 4CP and 8CP, the current through resistor 10 will be determined exclusively by the voltage at the centerpoint 6CP. As a result, the voltage across the resistor 10 back-biases the diodes 18 and 22 and the voltage at the tap 24 equals the voltage of the centerpoint 6CP. Thus, the diodes 18, 20 and 22 "OR" the voltages at the centerpoints 4CP, 6CP and 8CP and the voltage at tap 24 is always the largest of these voltages.

In this example, the fault in load 6 has caused the voltage at tap 24 to become unequal to the voltage at tap 38, and this causes a large fault output to be issued from comparator 40. It will be noted that even slight changes in resistance in any phase of any load under test will have this effect, and only if exactly counterbalancing changes take place in each of the other two phases (and this is extremely unlikely) will the resistance change be masked and a fault output fail to be generated.

If, alternatively, one of the phases of the source 2 develops a problem such as a voltage fluctuation or a short to ground, this will affect each of the centerpoints RCP, 4CP, 6CP and 8CP identically. In this instance, no fault output will be generated by the comparator 40.

Where, as mentioned above, the voltages at centerpoints 4CP, 6CP and 8CP are identical, there will still be a slight difference between the voltages at taps 24 and 38. This is because such identicality in voltage effectively places three equal resistors—resistors 12, 14 and 16—in parallel. Since resistor 34 advantageously has the same value as each of resistors 12, 14 and 16, the voltages at the taps 24 and 38 will be slightly different because a parallel network of three like resistors has a resistance which is less than each one of them taken alone.

It will be understood that the above-described voltage dividers and diodes are not essential. It would alternatively be possible to measure the voltages at each of the centerpoints of the loads to be monitored, to select the highest measured voltage, and to compare this highest voltage to the measured voltage at the reference centerpoint. However, in the preferred embodiment it is only necessary to know whether the loads are operating properly and to generate a fault signal if they are not. The diodes and voltage dividers achieve this objective with a minimum number of components.

The invention only requires one connection to each of the loads to be monitored. Because of this, little real estate on the loads is required. This is important because the surfaces of the loads are taken up with resistive circuits and temperature sensors and any space which is taken up by the monitoring function decreases the space available for the functions which the loads must perform.

Figure 2:
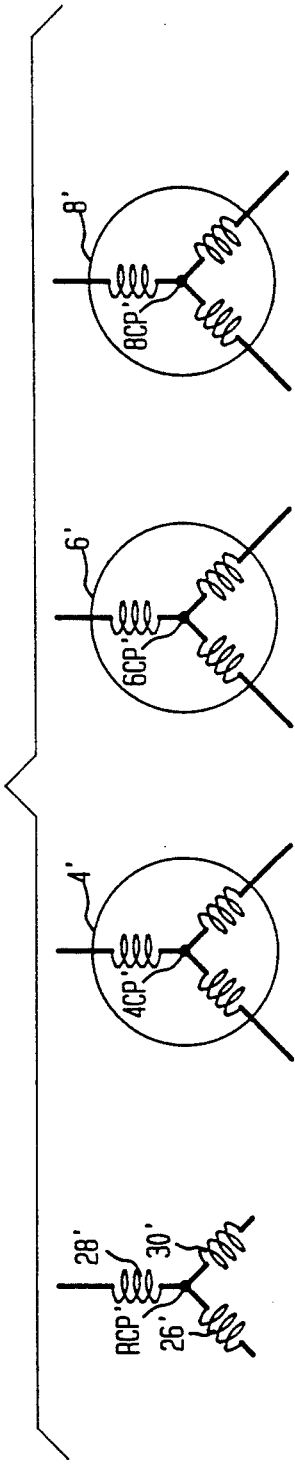
FIG. 2 shows an alternate construction of the reference load and the loads to be monitored where the invention is used to monitor inductive loads (such as motors).

It is not necessary that the loads 4, 6 and 8 be resistive, as shown. They may alternatively be wye-connected inductive loads, such as three-phase AC motors 4', 6' and 8' (see FIG. 2). In this instance, the reference load would be constructed not of like wye-connected resistors 26, 28 and 30 but of like wye-connected inductors 26', 28' and 30' (also see FIG. 2). It is only necessary that all the loads to be monitored be of the same type (resistive or inductive) as the reference load.

Resistors 12, 14, 16 and 34 are not absolutely necessary. If desired, the various components can be chosen so as to take advantage of the internal resistance of the diodes 18, 20, 22 and 32 and make them part of the voltage dividers. In the preferred embodiment, the resistors 12, 14, 16 and 34 are provided because they protect the diodes 18, 20, 22 and 32 from damage during testing and because if one diode fails open during operation, the resistors make the failed diode easier to locate.

Furthermore, the invention does not require any particular comparison scheme for the voltages at the centerpoints of the loads to be monitored, and the comparator may be provided with circuitry which causes a fault output to be generated only when the inequality at its inputs exceeds a predetermined threshold. Persons skilled in the art can readily adapt the invention to particular applications by choosing appropriate comparison algorithms.

Although a preferred embodiment has been described above, the scope of the invention is limited only by the following claims

I claim:

1. A fault detection circuit for determining the existence of a fault in any one of a plurality of wye-connected loads which are supplied by a three-phase source, comprising:
   a wye-connected reference load having three equal impedances connected to a floating reference centerpoint, each impedance being connected to a corresponding one of the phases of the source;
   means for monitoring the voltages at the centerpoints of all the wye-connected loads to be monitored and identifying the largest of said monitored voltages; and
   means for comparing said largest voltage and the voltage of said reference centerpoint.

2. The circuit of claim 1, wherein said comparing means operates in a manner that a fault output signal is produced when said largest voltage is substantially unequal to the voltage of said reference centerpoint.

3. The circuit of claim 1, wherein said monitoring means comprises a plurality of diodes with a common bias direction, one side of each of said diodes being connected to a corresponding one of the centerpoints of a wye-connected load to be monitored and the other sides of all of said diodes being connected together.

4. The circuit of claim 1, wherein each of the loads to be monitored is a resistive load and each of the impedances is a resistor.

5. The circuit of claim 1, wherein each of the loads to be monitored is an inductive load and each of the impedances is an inductor.

6. A fault detection circuit for determining the existence of a fault in any one of a plurality of wye-connected loads which are supplied by a three-phase source, comprising:
   a wye-connected reference load having three equal impedances connected to a floating reference centerpoint, each impedance being connected to a corresponding one of the phases of the source;
   a reference network connecting said reference centerpoint to ground through
      a) a diode which is connected to the centerpoint and
      b) a voltage divider which is connected between the diode and ground and which has a tap located above ground;
   a load network connected to each of the plurality of wye-connected loads which are to be monitored and having a like plurality of diodes, each of the diodes being connected, through a corresponding resistor, between a common point and the floating centerpoint of a corresponding one of the loads which are to be monitored, each of the resistors being located between the common point and the corresponding diode;
   a resistor connecting said common point to ground; and
   means for comparing voltages at said common point and said tap.

7. The circuit of claim 6, wherein said comparing means operates in a manner that a fault output signal is produced when voltages at said common point and said tap are substantially unequal.

8. A fault detection circuit for determining the existence of a fault in any one of a plurality of center-connected loads which are supplied by a multi-phase source, comprising:
   a center-connected multi-phase reference load having equal impedances connected to a floating reference centerpoint, each impedance being connected to a corresponding one of the phases of the source;
   means for monitoring the voltages at the centerpoints of all the center-connected loads to be monitored and identifying the largest of said monitored voltages; and
   means for comparing said largest voltage and the voltage of said reference centerpoint.

9. The circuit of claim 8, wherein each of the loads to be monitored is a resistive load and each of the impedances is a resistor.

10. The circuit of claim 8, wherein each of the loads to be monitored is an inductive load and each of the impedances is an inductor.

* * * * *